(12) United States Patent
Sawada et al.

(10) Patent No.: US 7,574,222 B2
(45) Date of Patent: Aug. 11, 2009

(54) METHOD AND SYSTEM FOR LOCATION MANAGEMENT AND LOCATION INFORMATION PROVIDING SYSTEM

(75) Inventors: Masahiro Sawada, Yokohama (JP); Masami Yabusaki, Kashiwa (JP)

(73) Assignee: NTT DoCoMo, Inc., Tokyo (JP)

( * ) Notice: Subject to any disclaimer, the term of this patent is extended or adjusted under 35 U.S.C. 154(b) by 290 days.

(21) Appl. No.: 10/082,797

(22) Filed: Feb. 25, 2002

(65) Prior Publication Data
US 2002/0147023 A1 Oct. 10, 2002

(30) Foreign Application Priority Data
Feb. 28, 2001 (JP) ............... 2001-055819
Apr. 9, 2001 (JP) ............... 2001-110325

(51) Int. Cl.
*H04W 24/00* (2009.01)
(52) U.S. Cl. ............... 455/456.3; 455/456.1; 455/435.1; 455/456.2; 455/458; 455/556.2; 342/357.09; 342/357.13; 701/208; 701/209; 701/213; 705/14
(58) Field of Classification Search ............... 455/456.1, 455/456.2, 456.3, 456, 435, 33.2, 41.2, 458, 455/435.1, 556.2; 701/213, 208, 209; 342/357.09, 342/357.13; 705/14
See application file for complete search history.

(56) References Cited

U.S. PATENT DOCUMENTS

| | | | |
|---|---|---|---|
| 5,559,865 A | | 9/1996 | Gilhousen |
| 5,577,264 A | * | 11/1996 | Tuohino ............... 455/432.1 |
| 5,724,660 A | * | 3/1998 | Kauser et al. ............ 455/456.2 |
| 5,815,810 A | | 9/1998 | Gallant et al. |
| 5,828,958 A | | 10/1998 | Ishida et al. |
| 5,835,845 A | | 11/1998 | Niki et al. |
| 5,898,922 A | | 4/1999 | Reininghaus |
| 5,926,765 A | | 7/1999 | Sasaki |
| 5,970,408 A | | 10/1999 | Carlsson et al. |

(Continued)

FOREIGN PATENT DOCUMENTS

AU       A-46850/97       11/1998

(Continued)

OTHER PUBLICATIONS

Maass, H. "Open Mobility Management Platform with Directory-Based Architecture and Signalling Protocols", Open Architectures and Network Programming, *IEEE*, San Francisco, CA, Apr. 3, 1998, pp. 72-87.

(Continued)

*Primary Examiner*—Dwayne Bost
*Assistant Examiner*—Pierre-Louis Desir
(74) *Attorney, Agent, or Firm*—Brinks Hofer Gilson & Lione

(57) ABSTRACT

In an information providing system, a user inputs desired mobile ID number to a client terminal. The client terminal transmits a request for location information on the mobile station including the mobile ID number to a location server via a location information server. The location server transmits a request for object movement information corresponding to the mobile station to an object information server. The location information server obtains the information from a traffic control device. Location information on the mobile station obtained by the location information server is transmitted to the terminal.

16 Claims, 11 Drawing Sheets

U.S. PATENT DOCUMENTS

| | | | |
|---|---|---|---|
| 6,097,942 | A | 8/2000 | Laiho |
| 6,160,804 | A | 12/2000 | Ahmed et al. |
| 6,272,344 | B1 * | 8/2001 | Kojima .................. 455/435.1 |
| 6,330,446 | B1 | 12/2001 | Mori |
| 6,363,323 | B1 * | 3/2002 | Jones ...................... 701/213 |
| 6,424,818 | B1 | 7/2002 | Hirono |
| 6,466,785 | B1 | 10/2002 | Chambert et al. |
| 6,466,788 | B1 | 10/2002 | Carlsson |
| 6,556,831 | B1 | 4/2003 | Büppelmann |
| 6,646,999 | B1 | 11/2003 | Kato et al. |
| 6,658,250 | B1 | 12/2003 | Ganesan et al. |
| 6,707,421 | B1 * | 3/2004 | Drury et al. ............. 342/357.1 |
| 6,813,501 | B2 * | 11/2004 | Kinnunen et al. ........ 455/456.2 |
| 2001/0049282 | A1 * | 12/2001 | Ushiki et al. ............ 455/422 |
| 2002/0077060 | A1 * | 6/2002 | Lehikoinen et al. .......... 455/41 |
| 2003/0013445 | A1 | 1/2003 | Fujiwara et al. |
| 2005/0197121 | A1 | 9/2005 | Fujiwara et al. |

FOREIGN PATENT DOCUMENTS

| | | |
|---|---|---|
| DE | 40 32 198 A1 | 4/1992 |
| DE | 196 47 461 A1 | 5/1998 |
| GB | 2 188 464 A | 9/1987 |
| JP | S63-054030 | 3/1988 |
| JP | H05-055991 A | 3/1993 |
| JP | H06-205457 A | 7/1994 |
| JP | H06-244780 A | 9/1994 |
| JP | H07-030962 | 1/1995 |
| JP | H08-140141 A | 5/1996 |
| JP | H08-214370 A | 8/1996 |
| JP | H09-327057 | 12/1997 |
| JP | 11-46380 | 2/1999 |
| JP | 11-355835 | 12/1999 |
| JP | 2000-324539 | 11/2000 |
| WO | WO 94/08406 | 4/1994 |
| WO | WO 96/13951 | 5/1996 |
| WO | WO 96/39638 | 12/1996 |

OTHER PUBLICATIONS

Irvine, J. et al. 'System Architecture for the MOSTRAIN Project (Mobile Services for High Speed Trains).' In 47$^{th}$ IEEE Vehicular Technology Conference. New York: IEEE, 1997, vol. 3, pp. 1917-1921.

An Office Action issued against a counterpart application in Canada, published on Jun. 4, 2004, 3 pages.

Patent Abstract of Japan for JP11-355835.

Gu, D. L. et al., "Hierarchical Routing for Multi-Layer Ad-Hoc Wireless Networks with UAVs" *IEEE*, 2000, pp. 310-314.

Pei, G. et al., "A Wireless Hierarchical Routing Protocol with Group Mobility" *IEEE*, 1999 pp. 1538-1542.

Japanese Office Action mailed Apr. 25, 2006.

Japanese Office Action dated Nov. 7, 2006 and its English translation.

Canadian Office Action dated Jul. 28, 2008.

Patent Abstract of Japan for JP11-355835, Dec. 24, 1999.

Office Action for Japanese Patent Application No. 2006-175714, dated Mar. 3, 2009 with English translation, 4 pages.

* cited by examiner

FIG. 2
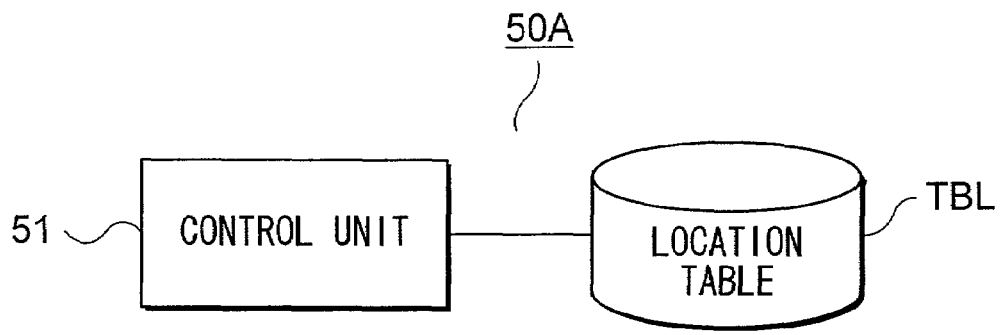
FIG. 3
| | IDm | LOCATION INFORMATION |
|---|---|---|
| Rb1 | X00001 | A01234 |
| Rb2 | X00002 | A01234 |
| Rb3 | X00003 | 5B |
| ⋮ | ⋮ | ⋮ |
FIG. 4
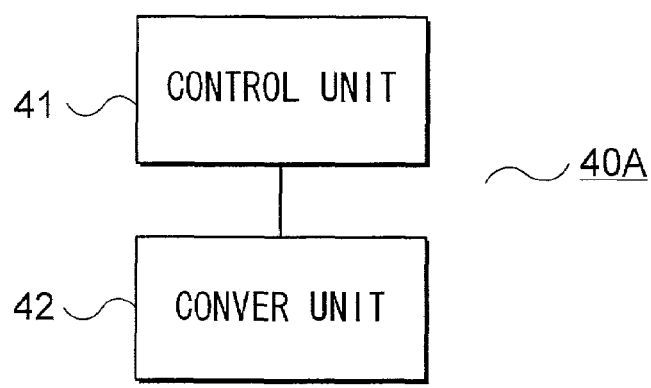

| TBLK | | INFx | | |
|---|---|---|---|---|
| | IDt | INF1 | INF2 | T |
| Rc1 | A01234 | LONG. 136° 15' E., 35° 45' N. | AZUSA NO. 2 | 13:00 |
| Rc2 | A01235 | TOKAIDO LINE, 2KM FROM SHINAGAWA, TO YOKOHAMA | AN ACCIDENT AT TOTSUKA | 9:50 |
| ⋮ | ⋮ | ⋮ | ⋮ | ⋮ |

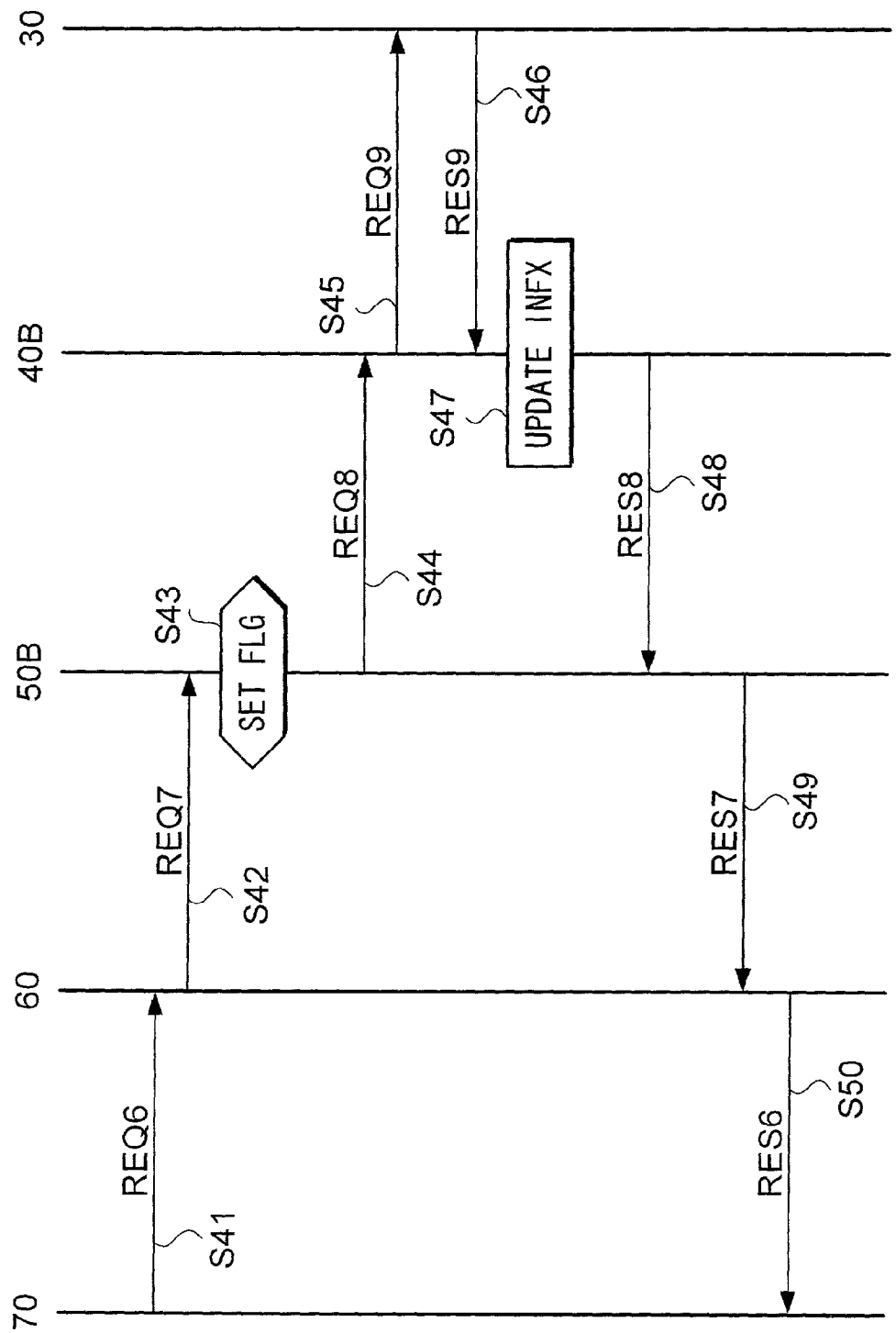

METHOD AND SYSTEM FOR LOCATION MANAGEMENT AND LOCATION INFORMATION PROVIDING SYSTEM

BACKGROUND OF THE INVENTION

1. Field of the Invention

The present invention relates to a method and a wireless communication system for managing information on locations of mobile stations and a location information providing system.

2. Description of the Related Art

In the conventional mobile communication system, a device for managing location of a plurality of mobile stations is provided, to store information about which area (called "location area") each of mobile stations is located. When an incoming call directed to a mobile station occurs, the device identifies the location area. Next, the device generates paging signal to transmit to the mobile station via a switch covering the location area and one of the base stations belonging to the switch.

In the registration of a location area, firstly a mobile station receives information on location area. Secondly, the mobile station transmits a number to identify the mobile station and the location area information, via the base station and the switch. Especially, there is a location management system of a mobile station in a train. In such a system, a communication device is provided in a train, to collectively manage location registration of all mobile stations in the train (reference will be made to Japanese Patent Application No. H11-355835).

However, it is cumbersome and costs a lot to provide such device in a train capable of processing requests of location registration from many mobile stations. Even if such devices are introduced, base stations and switches still must process large amounts of request especially in an urban city where many trains run. Specifically, radio channels have to be allocated to exchange signals for location registration between a location registration server and mobile stations. Therefore, radio frequency bandwidth available for voice and data communication is restricted thereby communication traffic volume increases. It is often the case that a moving object such as a train or a bus moves to a place such as a tunnel into which a radio wave transmitted from a base station does not propagate. In this case the base station does not receives any signals either from the object and a mobile station in the object, so that the location server cannot recognize a location of the mobile station.

There is a system for providing location information stored in the location server to an external terminal. In such a system, a location of a mobile station can be tracked in real-time. In principle, it is possible to know a future location of a mobile station as long as a user of the mobile station get off a train. However, in the conventional system such information on future location cannot be provided.

The present invention, as its object, provides a wireless communication system at a low cost, in which locations of mobile stations moving together with an object such as trains and buses are tracked accurately and efficiently. In addition, the present invention provides a communication system for providing a fixture location of a mobile station to a third party.

To attain the above object, a method of the present invention for managing location information on a mobile station in an object by a server on a mobile network comprising the steps of:

upon receiving object identification information from a transmitting device provided in the object, the mobile station transmitting to the server received object identifying information and mobile identifying information for identifying the mobile station;

the server receiving and storing correspondingly the object identifying information and the mobile identifying information;

obtaining, from a traffic control device which controls movement of the object, object movement information of the object identified by the object identifying information;

converting the movement information into a location area information; and managing location of the mobile station on the basis of the location area information.

In this method, a location of mobile station is tracked by transmitting a pair of mobile identifying information and object identifying information. It is not necessary to provide an expensive device, which can deal with registration requests from many mobile stations in an object at one time. It is only an inexpensive device for merely transmitting the object identifying information that is needed. Thus, this system can be established in at low cost. In a preferable embodiment, upon receiving a call for the mobile station, the server inquires about the movement information for the traffic control device. In another preferable embodiment the traffic control device notifies the server of the movement information when detecting movement of the object.

A method for communication in a communication system of the present invention having a server on a mobile network for communication with a mobile station and a traffic control device for controlling an object comprises the steps of:

upon receiving an object identifying information for identifying the object from a transmitting device provided in the object, the mobile station transmitting to the server mobile identifying information for identifying the mobile station and received object identifying information; and the server receiving the mobile identifying information and the object identifying information;

storing the mobile identifying information and the object identifying information correspondingly;

when receiving a call for the mobile station identified by the mobile identifying information, retrieving the object identifying information corresponding to the mobile identifying information; and transmitting retrieved object identifying information to the traffic control device; and the traffic control device generating movement information on the object identified by the object identifying information; and transmitting generated movement information to the server; and the server converting received movement information into location area information; and paging the mobile station on the basis of the location area information.

By using this method, it is not necessary to update registration of location every time a mobile station moves into another location area, once the object identifying information is registered with the server Therefore, radio traffic according to location registration is reduced.

In another embodiment, upon detecting a movement change of the object, the traffic control device generates movement information, transmits to the server the object identifying information and generated movement information. And the server receives the movement information, converts received movement information into location area information about an area within which the mobile station is located and stores the object identifying information and the location area information correspondingly. When receiving a call for the mobile station including the mobile identifying information, the server retrieves the location area information corresponding to the mobile identifying information and pages the mobile station on the basis of the location area information.

In this embodiment, the location server keeps the latest location area information on a mobile station. Therefore, the location server does not necessarily request movement information to the traffic control device, when a call for a mobile station is issued. Thus, identifying the mobile station to transmit a paging signal can be done quickly.

A communication system of the present invention has a traffic control device for controlling movement of an object and a mobile network. The mobile network comprises a mobile station, a base station for communicating with the mobile station, a switch for communicating with the base station, a location server for communicating with the switch, and an object information server for communicating with the location server and the traffic control device. The mobile station comprises means for receiving object identifying information for identifying the object and transmitting to the base station received object identifying information and mobile identifying information for identifying the mobile station. The location server comprises means for storing the object identifying information and the mobile identifying information correspondingly, both of which sent from the mobile station, means for retrieving and transmitting to the location server the object identifying information corresponding to the mobile identifying information, when receiving from the switch an inquiry of location area information on the mobile station including the mobile identifying information and means for receiving from the object information server and transmitting to the switch the location area information on the object identified by the object identifying information. The object information server comprises means for receiving from the location server and transmitting to the traffic control device the object identifying information, means for receiving from the traffic control device movement information on the object identified by the object identifying information, means for converting received movement information into the location area information and means for transmitting converted location area information to the location server. The traffic control device comprises means for receiving from the object information server the object identifying information and generating the movement information on the basis of received object identifying information and means for transmitting generated movement information to the object information sever.

In a preferable embodiment, the traffic control device comprises means for detecting movement change of the object and generating movement information representing movement of the object and means for transmitting to the object information server the object identifying information and the movement information. The object information server comprises means for receiving from the traffic control device the object identifying information and the movement information and converting received movement information into location area information representing an area within which the mobile station is located and means for transmitting to the location server the object identifying information and the location area information. The location server comprises a first storing means for receiving from the object information server and storing correspondingly the object identifying information and the location area information, a second storing means for storing correspondingly the object identifying information and the mobile identifying information, both of which sent from the mobile station and means for retrieving from the second storing means the object identifying information corresponding to the mobile identifying information, when receiving from the switch an inquiry of the location area information including the mobile identifying information.

Furthermore, it is possible that when not receiving from the transmitting device the object identifying information and moving into another location area, the mobile station transmits to the location server updated location information on the mobile station and the mobile identifying information. In addition, when receiving the location area information and the mobile identifying information sent from the mobile station, the location server stores to the second storing means the mobile identifying information and the updated location area information correspondingly, instead of the object identifying information.

An information providing system of the present invention for providing location information on a mobile station in a mobile network to a terminal comprises a location server in the mobile network for managing location of the mobile station and a location information server for carrying out communication with the terminal. Upon receiving from a transmitting device provided in an object identifying information for identifying an object, the mobile station transmits to the location server the mobile identifying information for identifying the mobile station and received object identifying information. The location server receives and stores correspondingly the object identifying information and the mobile identifying information sent from the mobile station. Upon receiving from the terminal an inquiry of location information on the mobile station including the mobile identifying information, the location information server judges whether the object identifying information corresponding to the mobile identifying information is stored in the location server. If the object identifying information is stored, transmits to the terminal boarding information representing that the mobile station is in the object By using the terminal in this system, a person can know that the mobile station is in the object.

In a preferable embodiment, the location information server further comprises means for identifying the mobile station using the mobile identifying information, carrying out communication with the mobile station, and obtaining from the mobile station the location information and transmitting to the terminal the boarding information and the location information.

In another preferable embodiment, the information providing system further comprises an object information server for carrying out communication with a traffic control device which controls movement of the object Upon receiving from the terminal an inquiry of location information including the mobile identifying information, the location information server transmits the mobile identifying information to the location server. Also, upon obtaining from the location server the location information, the location information server transmits to the terminal the boarding information and the location information. Upon receiving from the location information server the mobile identifying information, the location server transmits to the object information server the object identifying information corresponding to the mobile identifying information. Upon receiving the object identifying information from the location server, the object information server obtains from the traffic control device the movement information on the object corresponding to the object identifying information, converts obtained movement information into the location information, and transmits the location information to the location information server via the location server.

It is possible that when receiving from the terminal an inquiry of the location information on the mobile station, the location information server generates, on the basis of the movement information, estimated location information representing a future location on the mobile station and transmits the estimated location information to the terminal. In this system a person can obtain a future location of a mobile station in addition to the present location.

In another preferable embodiment, the object information server stores the movement information obtained from the traffic control device and the object identifying information correspondingly. When receiving from the location server the object identifying information, the object information server generates the location information on the object identified by the object identifying information on the basis of stored movement information on the object.

It is possible that upon detecting a movement change of the object, the traffic control device updates and notifies to the object information server of the movement information. Also, the object information server receives the movement information and generates the location information on the basis the movement information. A method of the present invention for providing location information of a mobile station in a mobile network to a terminal comprises the steps of:

the mobile station receiving, from a transmitting device provided in an object, object identifying information for identifying the object; transmitting to a server in the mobile network the object identifying information and mobile identifying information for identifying the mobile station;

the server storing the object identifying information and the mobile identifying information correspondingly;

when receiving from the terminal an inquiry of location information on the mobile station including the mobile identifying information, judging whether the object identifying information corresponding to the mobile identifying information is stored in the server; and if the object identifying information is stored, generating and transmitting to the terminal boarding information representing that the mobile station is in the object.

In a preferable embodiment the server stores the object identifying information and the mobile identifying information correspondingly. When receiving from the terminal an inquiry of location information on the mobile station including the mobile identifying information, the server retrieves the object identifying information corresponding to the mobile identifying information, obtains movement information on the object identified by the object identifying information, converts obtained movement information into the location information and transmits the location information to the terminal.

It is possible that when receiving the movement information, the server generates, on the basis of the movement information, estimated location information representing a future location of the mobile station and transmits the estimated location information to the terminal.

BRIEF DESCRIPTION OF THE DRAWINGS

FIG. 2 is a schematic diagram of a location server in the system.

FIG. 3 shows a detail of a location table in the system.

FIG. 4 is a schematic diagram of an object information server in the system.

FIG. 15 is a sequence diagram of the information providing system based on the fourth embodiment.

DETAILED DESCRIPTION

Reference will now be made in detail to the preferred embodiments of the invention, examples of which are illustrated in the accompanying drawings.

Figure 1:
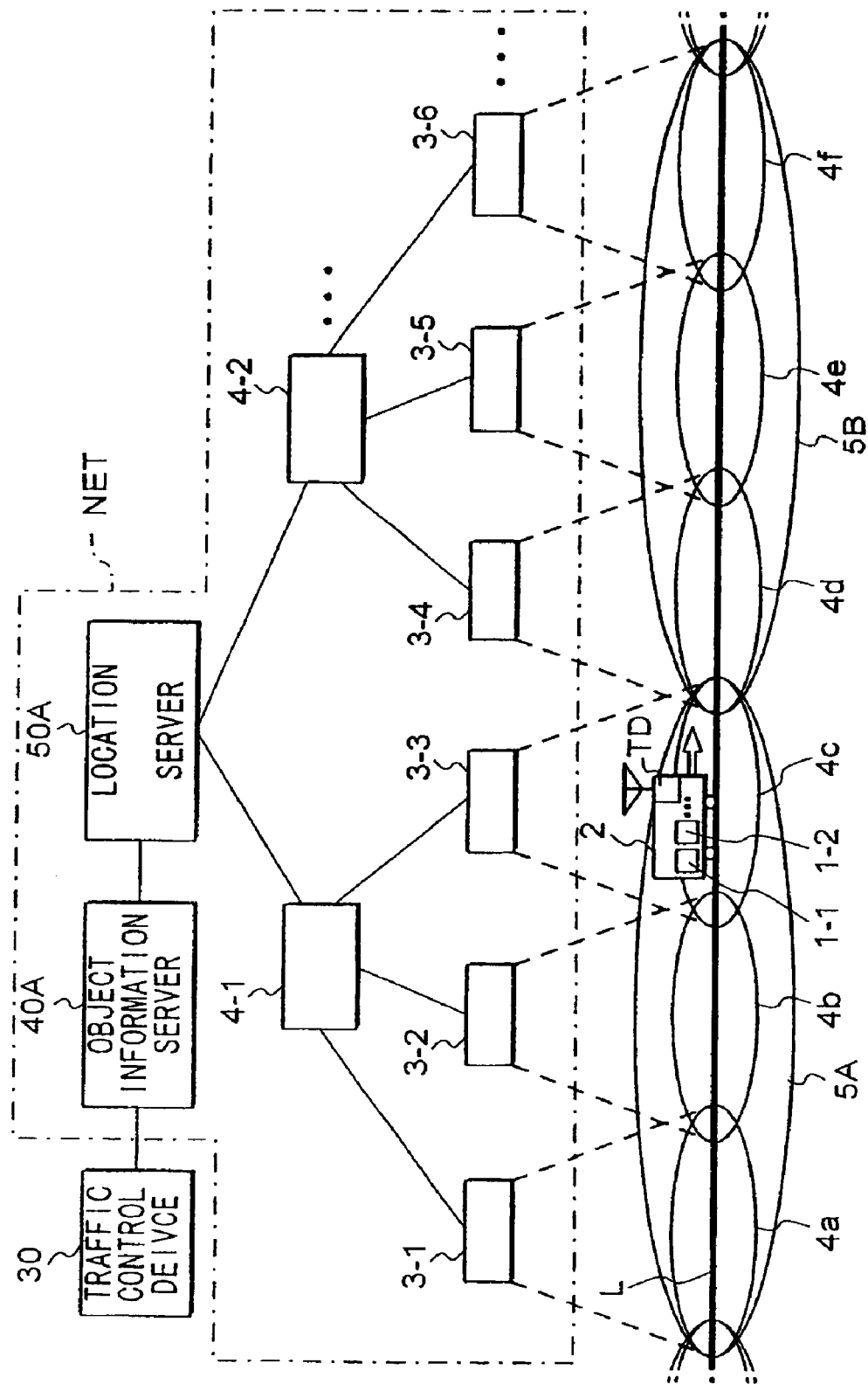
FIG. 1 is shows a communication system based on the first embodiment.

1. FIRST EMBODIMENT 1-1. Configuration of a Communication System of First Embodiment FIG. 1 illustrates a wireless communication system based on the first embodiment of the invention. As shown in FIG. 1, the system comprises a mobile network NET, a moving object 2, and a traffic control device 30. Object 2 is, for example, a train, a bus, and other means of transportation. It will now be described assuming that Moving object is a train In the figure only a moving object 2 is illustrated but in actuality, many trains 2 exist in the system. Traffic control device 30 manages movements of the trains. Traffic controls device 30 keeps track of each train, specifically, has present location, train schedule, and other information related to the train such as delay. Also, Traffic control device 30 generates movement information INFx, which is the latest information on a movement of an object, to transmit other devices.

Movement information INFx includes object location information INF1 on a location of Object 2 and related information INF2 for the movement. Specifically, a form of location information INF1 takes a form of "Longitude, Latitude" or "Name of line, Distance from neighboring station, Direction". For example, the detail of Location information INF1 is "Long.136° 15' E., 35° 45' N.", or "Tokaido line, 2 km from Shinagawa, to Yokohama". Related information INF2 includes a name of a train such as "Hikari No. 10" and a delay or suspension.

Mobile communication network NET has a plurality of base stations 3-1, 3-2, . . . ; a plurality of switches 4-1,4-2, . . . ; object information server 40A; and location server 50A. Location server 50A manages location area information of all mobile stations it covers.

Each of base stations 3-1, 3-2, . . . is provided at a certain distance from neighboring one and covers a base station areas 4s each lettered "4a" through "4f" as shown in FIG. 1. In other words, each of base stations can carry out radio communication with mobile stations within one of base station areas 4 it covers. As shown, each of base stations 3-1 through 3-6 covers each of Base station areas 4a through 4f. Each Location area 5 lettered 5A and 5B is a compilation of base station areas 4s. Each of Switches 4-1,4-2, . . . covers one of Location areas 4.

Object 2 has a transmitting device TD and moves on a railroad L. Railroad L extends across boundaries of Location areas 5. Transmitting device transmits an object ID number IDt by radio. Each of Objects 2 has a unique object ID number IDt. Each of Mobile stations 1 stores a unique mobile ID number IDm to identify a mobile station uniquely. Mobile ID number is, for example, a phone number.

When a user of Mobile station 1 is not in a train, Mobile station 1 receives and stores Location area information INF from Base station 3. When Mobile station 1 moves into another Location area 1, Mobile station 1 notifies Location information INF and Mobile ID number IDm to mobile communication network NET via Base station 3. When a user of Mobile station 1 gets aboard Object 2, Mobile station 1 receives object ID number IDt from Transmitting device TD and notifies Mobile ID number IDm and received Object ID number IDt to mobile communication network NET via Base station 3.

Specifically, Mobile station 1 keeps watching on reception of Object ID number IDt. Only when Mobile station receives Object ID number IDt, Mobile ID number IDm and Object ID number IDt are transmitted to Mobile communication network NET. In other words, Location area information INF is not transmitted during the ride. This results in a reduction of frequency of transmission of information on location about a mobile station that is necessary for a registration.

1-2. Configuration of Location Server 50A

As shown in FIG. 2, Location server 50A has a control unit 51 and a location table TBL. Control unit 51 reads from or writes to Location table TBL data In addition, Control unit 51 carries out communication with Object information server 40A and Switch 4, to manage locations of all Mobile stations 1 in Mobile communication network NET. In addition, Location server 50A generates paging signal when an incoming call for Mobile station 1 is issued.

FIG. 3 shows information stored in Location table TBL. Location table TBL has a plurality of records Rb1, Rb2, . . . , in each of which a Mobile ID number IDm and location information of a mobile station are stored The location information is either Location information INF or an Object ID number. Specifically, when a Mobile station 1 is in a train Object ID number IDt is stored, while when not in a train Location area information INF is stored.

For example, if a mobile station whose Mobile D number IDm is "X0001", is in Object 2 whose Object ID number is "A01234", "X00001" and "A01234" are stored in Rb1 of Location table TBL correspondingly as shown in FIG. 3. If a mobile station whose Mobile ID number is "X00003" is not in Object 2, Mobile ID number "X00003" and Location area information INF "5B" are stored correspondingly in a record Rb3.

1-3. Configuration of Object Information Server 40A

FIG. 4 is a schematic diagram of Object information server 40A. As shown, Location information server has a control unit 41 and a convert unit 42. Control unit 41 carries out communication with Traffic control device 30 and Location server 50A as well serves as nerve center of Object information server 40A. Convert unit 42 converts Object location information INF1 included in Movement information INFx sent from Traffic control device 30 into Location area information INF. In one example, Convert unit 42 has a first table for storing Location area information INF and locations represented by latitude and longitude correspondingly; and a second table for information on routes of trains and Location area information INF. Upon obtaining Movement information INF1 in a "Latitude, Longitude" form, Convert unit 42 retrieves from the first table Location area and outputs to Control unit 41 information corresponding to object location information INF. In case of reception of Movement information INF1 in a "Line name, Distance from neighboring station, Direction" form, Convert unit 42 retrieves from the second table and outputs to Control unit 41 a present location of Object 2 corresponding to the Object location information INF1.

It is noted that although Object location information INF1 could take various forms, conversion of any types of Location area information INF1 can be effected by Convert unit 42.

1-4. Operation of the System

Figure 5:
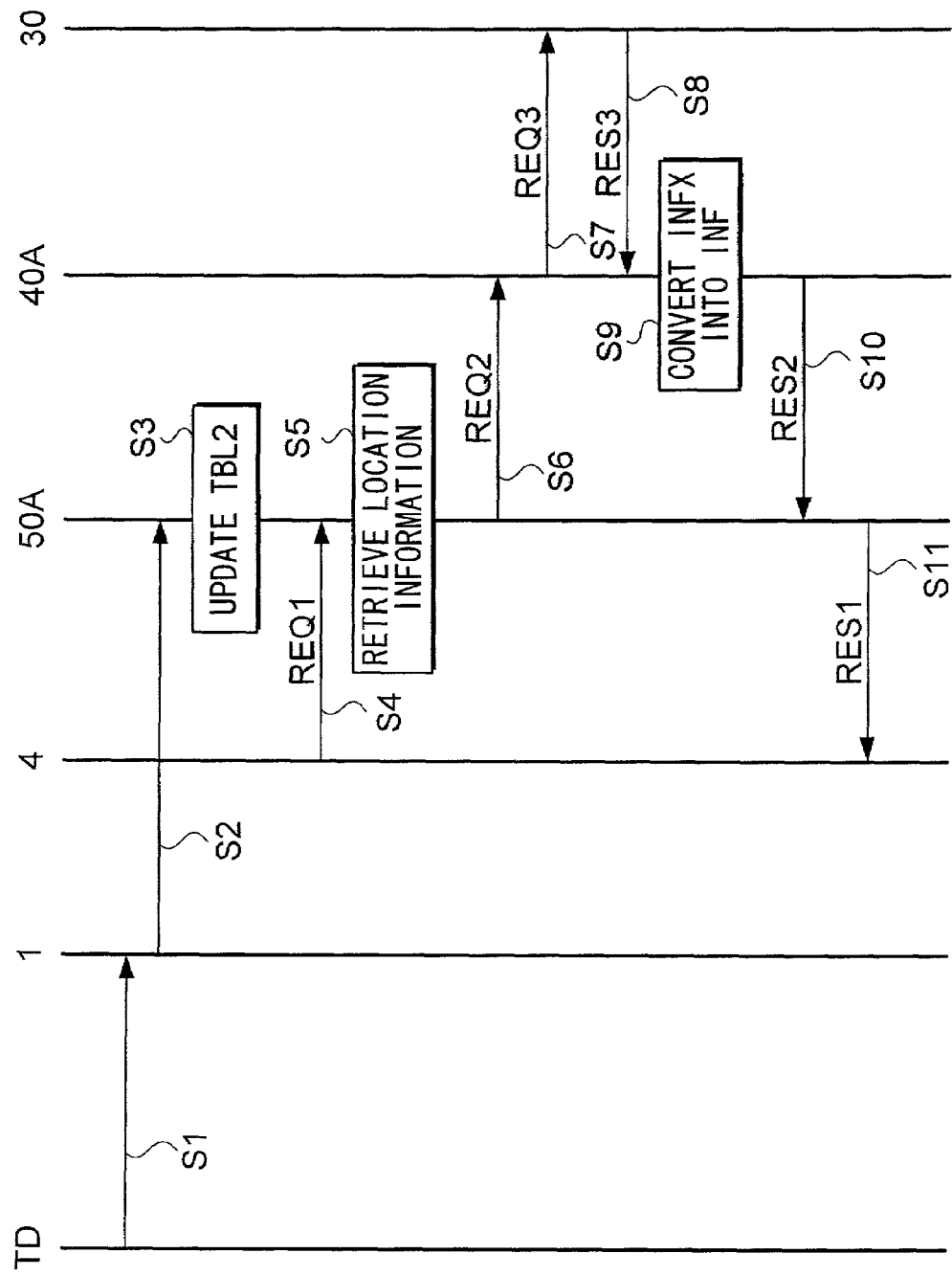
FIG. 5 is a sequence diagram of the system.

One example of operations of a wireless communication system of the invention will now be described referring to the drawings. FIG. 5 is a sequence diagram of the communication system. When Mobile station 1 comes into Object 2, the Mobile station 1 receives an Object ID number IDt sent from Transmitting device TD (step S1) and transmits to Location server 50A registration request including the Object ID number IDt and a Mobile ID number IDm via Base station 3 and Switch 4 (not shown) (step S2). When Location server 50A receives the registration request, the Object ID number IDt and the Mobile ID number IDm are extracted from the request and stored in Location table TBL (step S3).

For example, if the Mobile ID number IDm is "X0002" and the Object ID number is "A01234", "X0002" and "A01234" are stored correspondingly in Rb2 of Location table TBL as shown in FIG. 3.

It is noted that even when a Mobile station 1 comes across a border between location areas, the Mobile station 1 does not transmit Location area information as long as the Mobile station 1 is in an object thereby keeps receiving Object ID number IDt.

When one of Switches 4 receives a call for Mobile station 1, the Switch 4 issues a location request REQ1 to Location server 50A (step S4). REQ1 includes Mobile ID number IDm of the Mobile station 1. When Location server receives Location request REQ1, Control unit 51 retrieves from Location table location information corresponding to the Mobile ID number (step S5). Control unit 51 judges whether received location information is Location area information INF or Object ID number IDt.

If Control unit 51 retrieves Location information INF, Control unit 51 transmits retrieved Location information INF to the Switch 4. In this case, Location server 50A generates and transmits to Object information server 40A location request REQ2 (step 6).

Object information server 40A generates and transmits to Traffic control device 30 a movement request REQ3 including the Object ID number IDt (step S7). Traffic control device 30 firstly converts received Object ID number IDt into a certain number available for Traffic device 30 and secondly generates Movement information INFx. Next, Traffic control device 30 transmits Movement response RES3 including the Object ID number IDt and the Movement information INFx to Object information server 40A (step S8).

Object information server firstly 40A converts Object location information INF1 included in received Movement information INFx into Location area information INF (step S9) and next transmits a location area response RES2 including the location area information INF and the Object ID number IDt to Location server 50A (step S10).

After the reception of Location area response RES2, Location server 50A transmits to Switch 4 a location area response RES1 including the location area information INF and the Object ID number IDt (step S11). Switch 4 issues a paging request including the Mobile ID number to Base stations 3 within a location area designated by the Location area information INF. When the Mobile station answers, the connection is established.

In this system a mobile station does not notify location area information to any nodes in a mobile network during the ride. Therefore, the load on the network is reduced thereby improves system performance.

In addition, a communication device capable of registering many mobile stations in a train at one time is not necessarily introduced. The only device provided in a train is one for transmitting an ID number by radio. Therefore, this system can be established at a low cost. In addition, since Convert unit is introduced to convert Movement information INFx into Location area information INF, information on location of a train can be managed regardless of data format of object location information which a traffic control device has.

2. SECOND EMBODIMENT

2-1. Configuration of a Communication System

A wireless communication system based on the second embodiment is similar to that of the first embodiment, except that a location server 50B is introduced instead of Location server 50A.

Figures 6, 7:
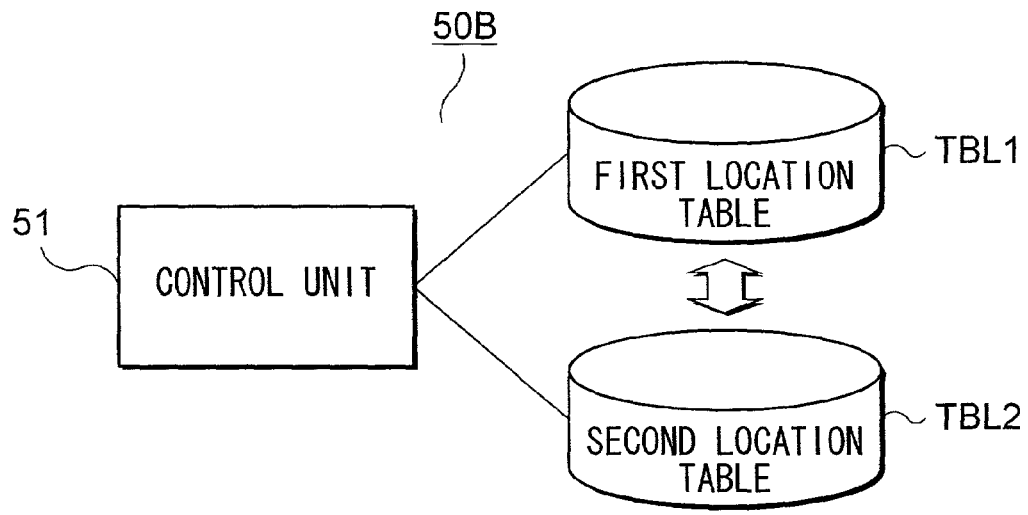
FIG. 6 is a schematic diagram of an object information server used for a communication system based on the second embodiment.
FIG. 7 shows details of a first and a second location table of the location server.

FIG. 6 is a schematic block diagram of Location server 50B. As shown, Location server 50B has a control unit 51, first location table TBL1, and second location table TBL2. Second location table TBL2 is the same as Location table of the first embodiment. FIG. 7 shows details of the First location table and Second location table. First location table TBL1 has a plurality of records Ra1, Ra2, . . . , each storing Object ID number IDt and location area information INF correspondingly. It is noted that the records and Objects 2 are same in number. For example, if Object 2 is located within a location area 5A and Object ID number IDt is "A01234", "A01234" and "5A" are stored in a record Ra1 of First location table TBL1 as shown in FIG. 7.

In this system upon updating movement information INFx on an Object 2, Traffic control device 30 transmits the updated information to Object information server 40A. Object information server 40A firstly converts received information INFx into Location area information INF and secondly transmits the converted information INF to Location server 50B. Location server 50B receives and stores to First location table TBL1 the Movement information INFx. In this way information stored in First location table TBL1 is updated. Information stored in Second location table TBL2 is updated by notification from Mobile station 1, as described in the first embodiment.

2-2. Operation of the System

Figure 8:
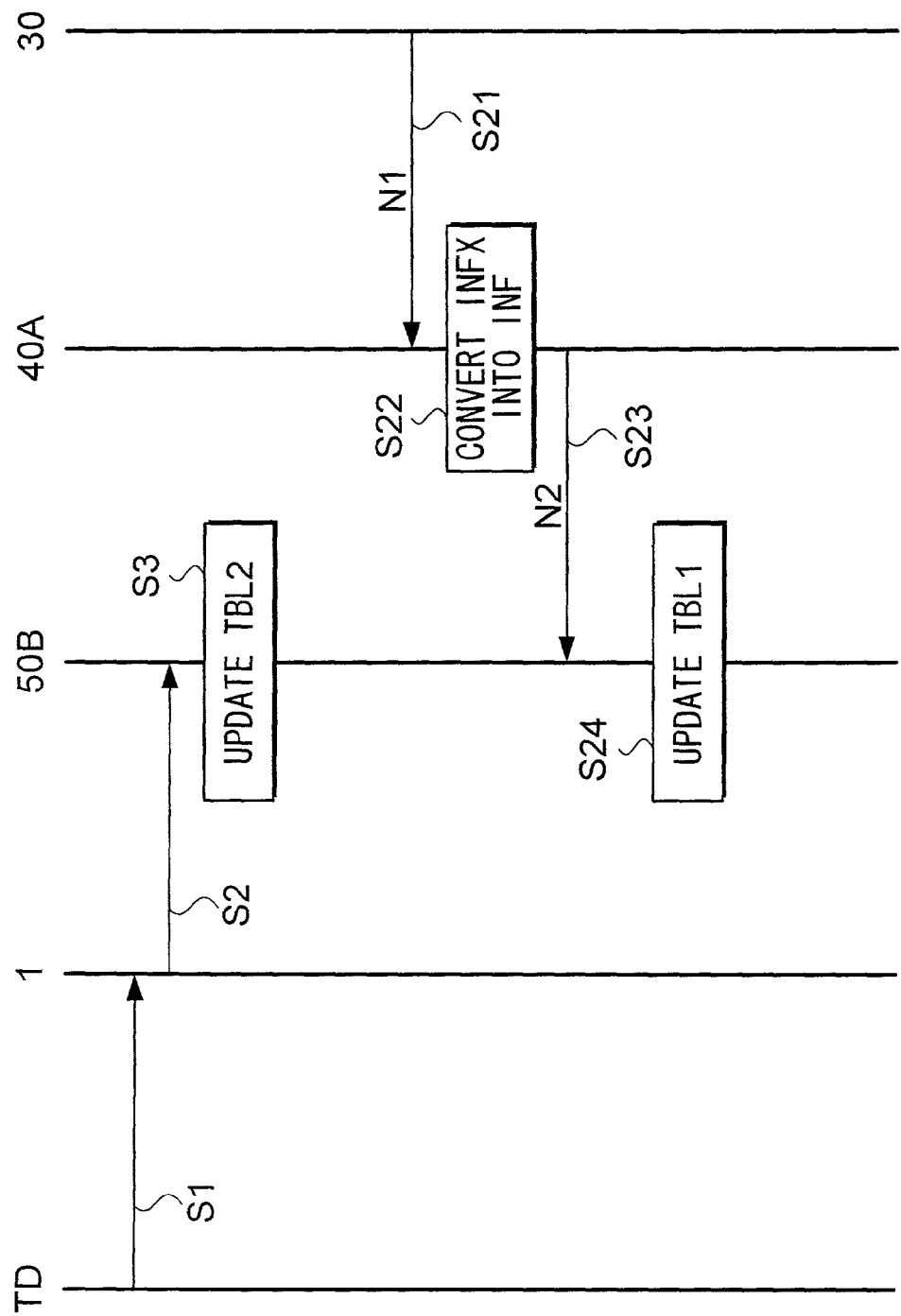
FIG. 8 is a sequence diagram of the system based on the second embodiment.

Operations of the wireless communication system based on the second embodiment will now be described referring to FIG. 8. As shown, steps S1 through S3 are the same as those of first embodiment.

When Traffic control device 30 updates Movement information INFx, Traffic control device 30 transmits a movement notice N1 including an Object ID number and updated information INFx to Object information server 40A (step S21). When receiving Movement notice N1, Object information server 40A converts Object location information INF1 included in the Movement information INFx into Location area information INF (step S22). Next, Object information server 40A generates and transmits to Location server 50B an Area notice N2 (step S23).

Suppose here that Object 2 is "Tokaido Line" moving from Shinagawa station to Yokohama station and Shinagawa and Yokohama station are located within "5A" and "5B", respectively. When the train arrives at Yokohama station, Traffic control device 30 generates Object location information INF1 indicating a stop of the train at Yokohama station. Next Traffic control device 30 transmits Movement notice N1 including the information INF1. Object information server 40A receives Movement notice N1. Convert unit 42 converts INF1 into Location area information INF. Control unit 41 generates and transmits to Location server 50B Area notice N2 including an Object ID number IDt and the location area information INF.

Location server 50B receives the Area notice N2 and updates location area information INF corresponding to the Object ID number IDt stored in First location table TBL1 (step S24). Specifically, if Object ID number IDt is "A01234" Location area information INF in record Ra1 is updated from "5A" to "5B" shown in FIG. 7. In this way First table TBL1 has the latest information on movement.

In other words, Object information server 40A does not ask Traffic control device for movement information when a call for Mobile station 1 in Object 2 is issued. Therefore, Location server 50B is able to obtain location area information on the mobile station quickly, thereby Switch 4 is able to route incoming calls effectively.

3. THIRD EMBODIMENT

An information providing system based on the third embodiment is an application of the system based on the second embodiment.

3-1. Configuration of the System

Figure 9:
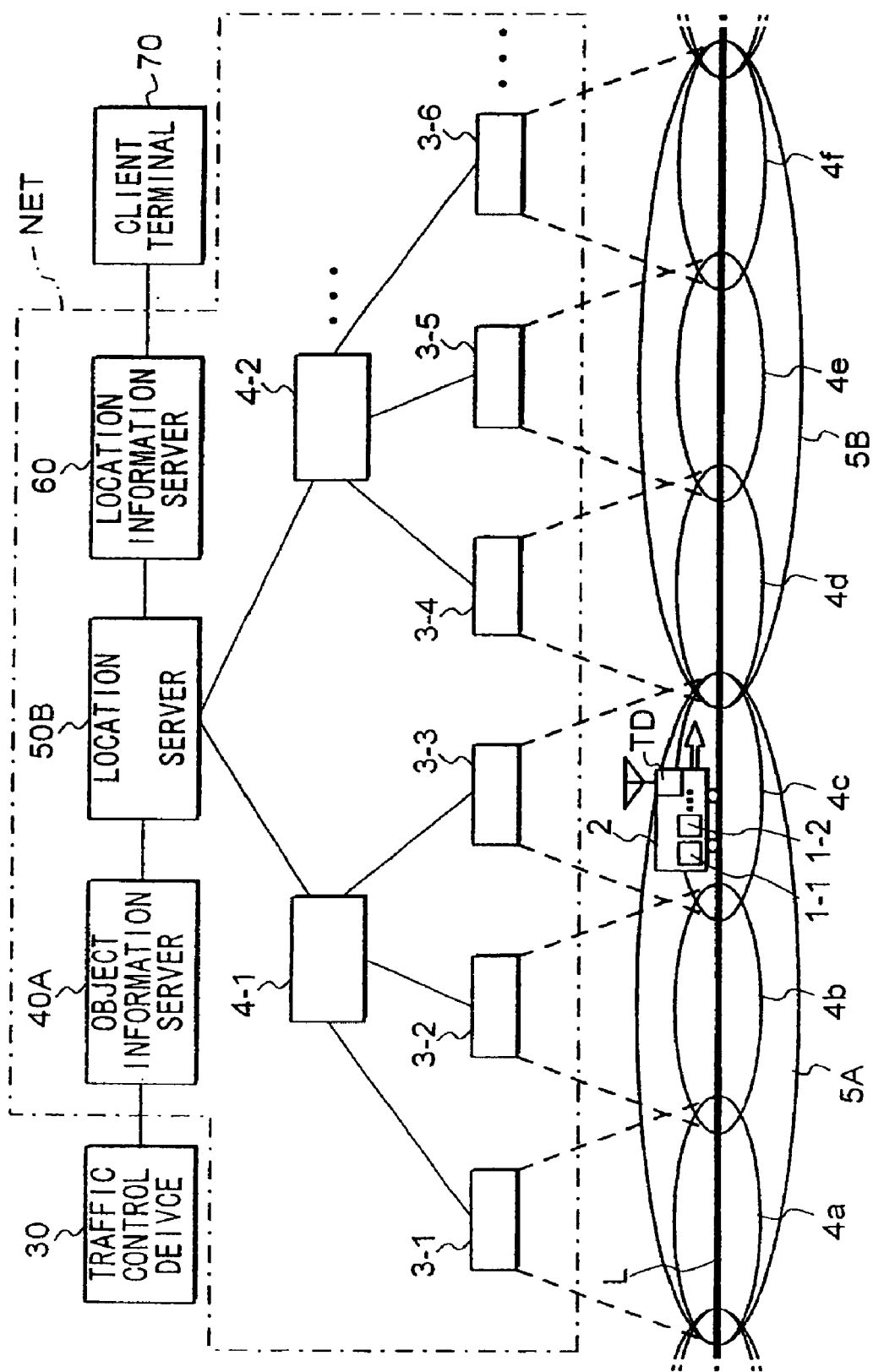
FIG. 9 is an information providing system based on the third embodiment.

FIG. 9 is a schematic diagram of the system of this embodiment. This system differs from that of the second embodiment only in having a Location information server 60, Client terminal 70, and Mobile station 1A instead of Mobile station 1. Client terminal 70 is, for example, a Personal Computer (PC), Personal Digital Assistants (PDA), mobile phone, and other communication devices, which carry out communication with Location information server 60.

Figure 10:
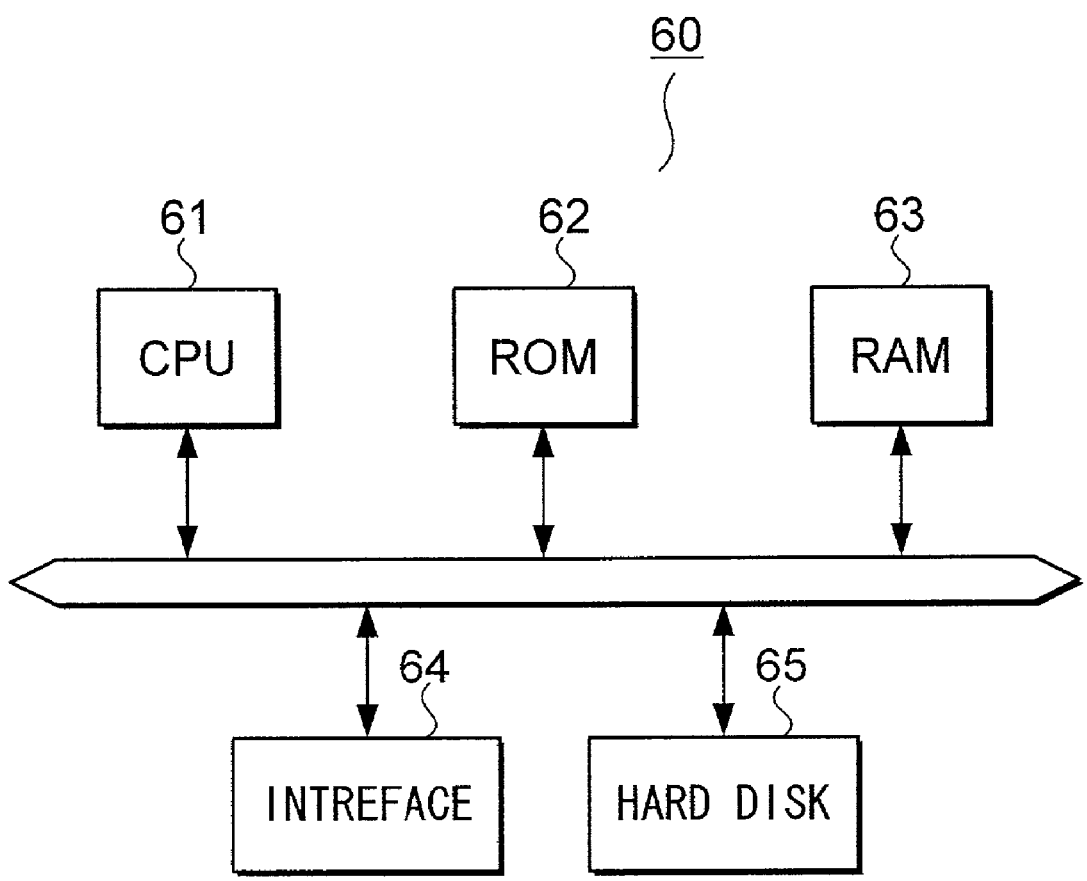
FIG. 10 is a schematic diagram of an information server in the system.

FIG. 10 is a schematic block diagram of Location information server 60. As shown, Location server has a Central Processing Unit (CPU) 61, Read Only Memory (ROM) 62, Random Access Memory (ROM) 63, Interface 64, and Hard disk 65. Location information server 60 provides location information of Mobile station 1A responsive to a request from Client terminal 70.

Specifically, CPU 61 controls all the functions of all devices in Location information server 60 and executes applications. ROM 62 stores, for example, a boot program. RAM 63 temporarily stores data or application programs for CPU 61. Hard disk 65 stores application programs, which are a communication program for the communication with Client terminal 70 and Location server 50B, an estimation program for the estimation of a future location of Object 2, and a call program for calling Mobile station 1 on the basis of Location area information INF. Bus 150 links all devices.

Figure 11:
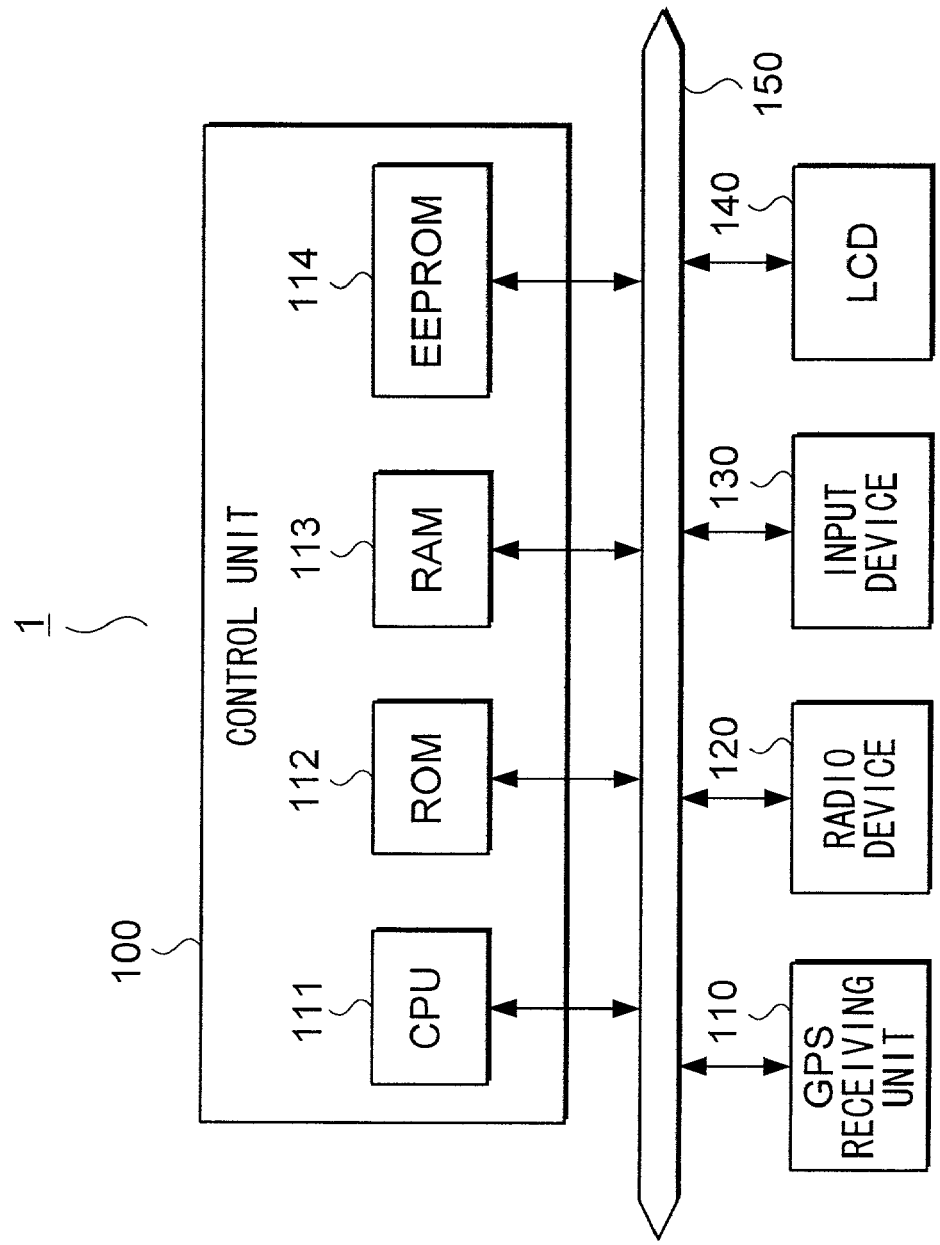
FIG. 11 is schematic diagram of a mobile station.

Mobile station 1A differs form Mobile station 1 in having functions of generation and transmittance of location information. FIG. 11 is a schematic diagram of Mobile station 1A. As shown, Mobile station 1A has a control unit 100, Global Positioning Systems (GPS) receiver 110, radio device 120, input device 130, Liquid Crystal Display (LCD) 140, and Bus 150. GPS receiver 110 receives radio wave sent by a satellite and generates information on the present location of Mobile station 1A including the longitude and latitude. Radio device 120 carries out radio communication with Base station 3 under control of CPU61. Input device 130 has buttons including Push Button (PB) and cursor keys and sends information on a user's direction into Control unit 100. LCD 140 displays information. Control unit 100 has a CPU 111, ROM 112, RAM 113, and EEPROM 114; and controls all the functions of all devices in Mobile station 1A. ROM 112 has application programs for the control of devices, communication with Location information server 60, and generation of related information.

The related information includes, for example, a direction and velocity of Object 2. RAM 113 temporarily stores data and application programs for CPU 111. EEPROM 114 non-volatile memory and stores updated application programs. Bus 150 electrically connects all devices.

3-2. Operation of the System

Figure 12:
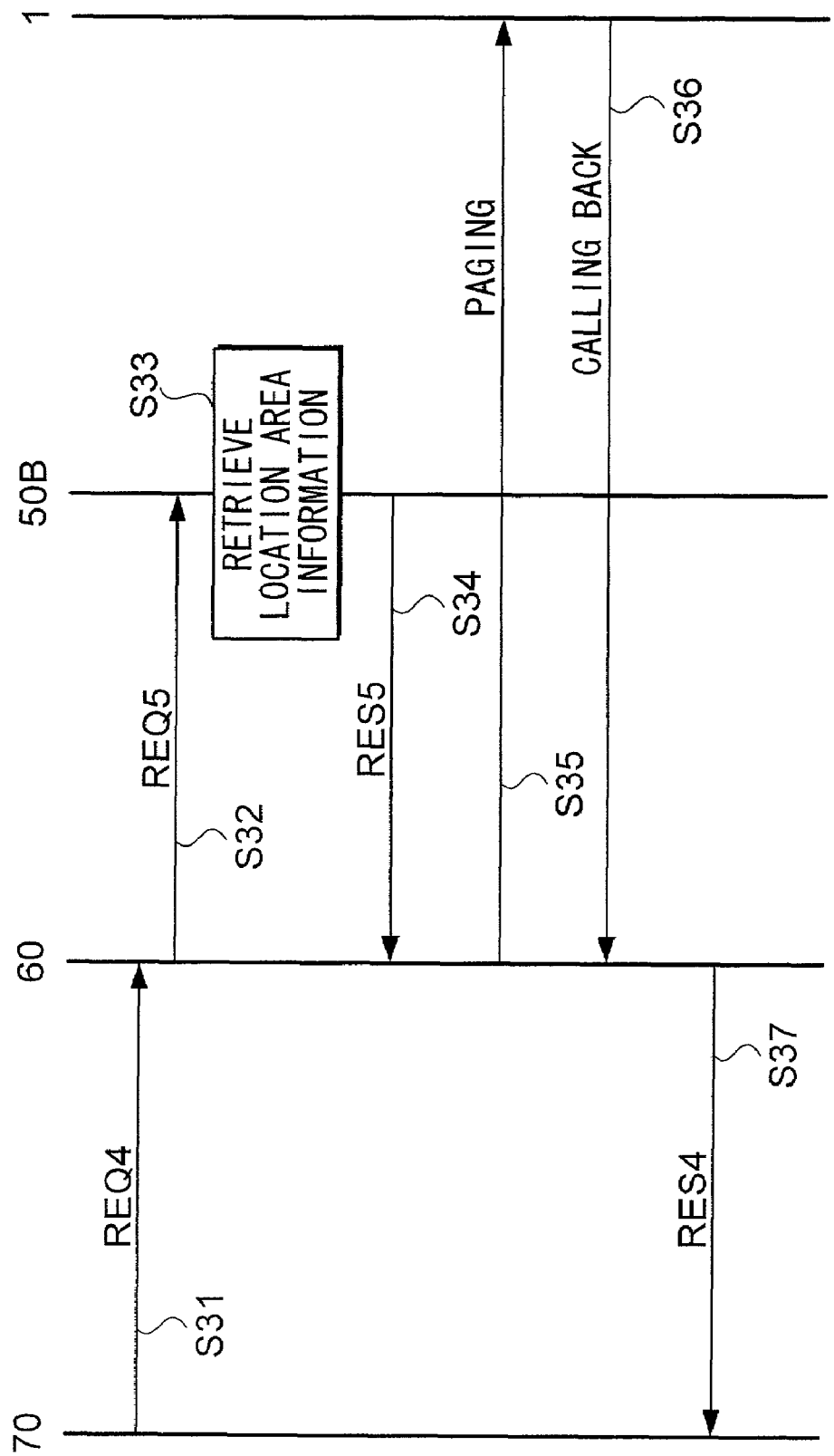
FIG. 12 is a sequence diagram of the system.

FIG. 12 is a sequence diagram of the information providing system. It is noted that this system carries out procedures for updating location area information INF, which is the same as that in the second embodiment.

A user operates Client terminal 70 with Input device 130 to access Location information server 60. Client terminal 70 displays in LCD 140 direction for input of Mobile ID number. When the user input a Mobile ID number IDm (phone umber, for example), Client terminal 70 transmits to Location information server 60 location request REQ 4 including the Mobile ID number IDm (step S31).

Upon receiving location request REQ 4, Location information server 60 transmits location request REQ 5 including the Mobile ID number to Location server 50B (step S32). Location server 50B receives location request REQ5 and retrieves location area information INF corresponding to the Mobile ID number IDm from First location table TBL1 and Second location table TBL2 (step S33). Furthermore, if Object ID number IDt is stored in Second Location table TBL2, Location server set a flag FLG to "1". If Object ID number IDt is not stored, the flag FLG is set to "0" (step S33).

Next, Location server 50 transmits to Location information server 60 a location request RES 5 including the Location area information INF and Flag FLG (step S34). Location information server 60 receives Location response RES 5 and executes the estimation program, to page Mobile station 1A (step S35). Specifically, Location information server pages, via a Switch, Base stations 3 located within an area identified by the Location area information INF, by sending a paging signal including Mobile ID number. In addition, if Flag FLG is set to "1", Location information server 60 generates boarding information indicating whether a user of Mobile station 1A takes on a train. If Flag FLG is set to "0", the boarding information is not generated.

Upon receiving the paging signal, Mobile station 1A generates and transmits to Location information server 60 location information on the present location and related information including a direction and velocity (step S36).

Location information server 60 receives the location information and the related information from Mobile station 1A and transmits the location information, related information, and the boarding information to Client terminal 70 (step S37). For example, a user of a mobile station 1A aboard a train which is located at Long.136° 15' E., 35° 45' N. and heading toward South at a velocity of 46 Kilometers/hour. In this case, Location information "Long. 136° 15' E., 35° 45' N.", related information "46 Km/h, South", and boarding information "Now boarding" are transmitted to Client terminal 70.

In case a user is not aboard, Location information server 60 does not transmit the boarding information since Flag FLG in location response RES 5 is set to "0" As described above, people are able to obtain boarding information as well as location information of Mobile station 1A by operating Client terminal 70 in this system.

3-3. Modification of the Third Embodiment

As described above, the system of the third embodiment is comprised by adding the system of the second embodiment to Location server 60 and Client terminal 70. However, it is possible to introduce a system in which Location server and Client terminal 70 are added to the system of the first embodiment.

In this system, when Location server 50A receives Location request REQ 5 from Location information server 60, steps S5 through S10 shown in FIG. 5 are carried out. In this way Location server 50A obtains and transmits to Location information server 60 Location area information INF. Next, Location information server 60 pages Mobile station 1A, on the basis of the Location area information INF, similarly to the third embodiment.

4. FOURTH EMBODIMENT 4-1. Configuration of a System

An information providing system based on the fourth embodiment is the same as that of the third embodiment except for detailed function of Traffic control device 30 and use of an object information server 40B instead of 40A and Mobile station 1 instead of 1A. Specifically, Traffic control device 30 transmits Movement information INFx only when receiving a request from Object information server 40B, similarly to the first embodiment. Object information server 40B has a management table TBLk as shown in FIG. 13, differing from Object information server 40A.

Figures 13, 14:
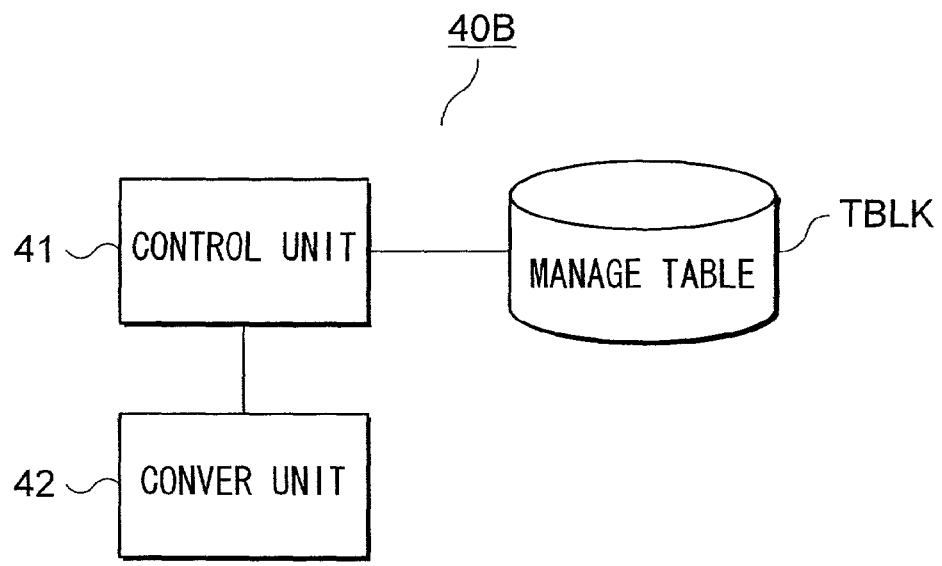
FIG. 13 is a schematic diagram of an object management device in an information providing system based on the fourth embodiment.
FIG. 14 shows a detail of a management table of the object information server.

FIG. 14 shows an example of information stored in Management table TBLk. Management table TBLk has a plurality of records Rc1, Rc2, . . . , each storing an Object ID number IDt, Movement information INFx, and timestamp T. Timestamp T represents the time when Movement information INFx is stored. Specifically, upon storing Movement information INFx, Control unit 51 obtains time from a timer not shown in the figure and writes the time to Management table TBLk. For one example, Record Rc1 indicates that Object location information INF1 "Long.136° 15' E., 35° 45' N." is stored corresponding to Object ID number "A01234" at 13:00.

4-2. Operations of the System

Operations of the system will now be described referring to FIG. 15. FIG. 15 is a sequence diagram of the system. Steps S41 and S42 is the same as steps S31 and S32 as described above, respectively.

Next, Location server 50B accesses Second location table TBL2. If Object ID number IDt is stored corresponding to a Mobile ID number, Location sever 50B sets the flag FLG to "1". If the Object ID number is not stored, FLG is set to "0" (step S43). If Object ID number IDt is stored, Location server 50B transmits movement request REQ 8 including the Object ID number IDt to Object information server 40B (step S44).

Object information server 40B receives the Movement request REQ 8 and retrieves from Management table TBLk Movement information INFx and Timestamp T, each corresponding to the Object ID number IDt. If Movement information INFx is not stored in Management table TBLk or a predetermined time has elapsed since the time represented by Timestamp T, Object information server 40B transmits a movement request REQ 9 to Traffic control device 30 (step S45).

Traffic control device 30 generates Movement information INFx about an Object 2 identified by the received Object ID number IDt and transmits to Object information server 40B a movement response RES 9 including the INFx (step S47). Object information server 40B transmits to Location server 50B a movement response RES 8 including the Movement information INFx (step S48).

If Movement information INFx is stored in Management table TBLk and a predetermined time has not elapsed since time T, Object information server 40B skips steps S45 through S47 and transmits a movement response RES 8 to Location server 50B (step S48).

Location server 50B transmits a movement response RES 7 including the Movement information INFx to Location information server 60 (step S49). Location information server 60 receives Movement response RES7 and extracts INF2 from the Movement information INFx included in Movement response RES 7 to estimate a future location of Object 2. A specific way of estimation is as follows:

Suppose that a user of a mobile station 1 is in a train whose Object ID number is "A01234" and Management table TBLk stores detailed information shown in FIG. 14. When Location information server 60 receives a location request REQ6 from Client terminal 70, steps S42 through S49 are carried out as described above. As a result, Location information server 60 obtains Related information INF2 "Azusa No.2". Next, Location information server 60 estimates a future location of the train referring to timetable data stored in Hard disk 65. The estimated location information generated by Location information server 60 includes, for example, "arrive at Kofu in 18 minutes".

Next, Location information server 60 transmits to Client terminal 70 a location response RES6 including Object location information INF1, Related information INF2, and Boarding information (step S50). Specifically, INF1 "Long.136° 15' E., 35° 45' N.", INF2 "Azusa No.2", and Estimated location information "This train will arrive at Kofu in 18 minutes", and Boarding information "Now boarding" is transmitted to Client terminal 70.

As described in this embodiment, a person is able to obtain the present and future location of a mobile station by inputting a Mobile ID number to Client terminal 70. In this system, location information of a Mobile station can be obtained, even if the mobile station in Object 2 cannot carry out radio communication with Base stations because Object 2 is moving through a tunnel, for example.

In addition, the number of inquires to Traffic control device 30 for getting the latest information on an object can be minimized. Since Object information sever 40B checks Timestamp T, to judge whether to obtain the information from Traffic control device 30. In other words, the information is obtained efficiently and precisely.

4-3. Modification of the Fourth embodiment

It is possible that Traffic control device 30 transmits the latest Movement information INFx to Movement information server 40B every time the information INFx is updated. In this case, Location server is able to obtain the latest information on Object 2 and needs not to refer to Timestamp T.

It is also possible that a person uses Client terminal 70, to designate the detailed future location of a Mobile station. For example, a user inputs the desired time (an hour later, for example) in addition to Mobile ID number. After reception of Object location information INF1, Related information INF2, and Estimated location information, the Location information server 60 retrieves the estimated location of "Azusa No.2" (near Matsumoto station, for example) referring to the schedule stored Hard disk 65. Retrieved information is transmitted to Client terminal 70.

5. SUPPLEMENT

As described in the above embodiments, when a user of Mobile station 1 gets aboard a train, Mobile station 1 receives Mobile ID number IDm from Transmitting device TD and notifies Mobile ID number IDm and received Object ID number IDt to Mobile communication network NET via Base station 3. However, it is possible that a device provided in Object 2 transmits Mobile ID numbers IDms each of which is sent from Mobile station 1 and Object ID number IDt, to mobile communication network NET. In this case, the device has the function of receiving Object ID number IDt and Mobile ID number IDm. As an example, Transmitting device TD may have the function. The point is that Object ID number IDt and Mobile ID number IDm are transmitted together to Mobile communication network NET, when a user gets aboard.

Although the foregoing description provides many variations for use of the present invention, these enabling details should not be construed as limiting in any way the scope of the invention, and it will be readily understood that the present invention is susceptible to many modifications, and equivalent implementations without departing from this scope and without diminishing its attendant advantages. It is therefore intended that the present invention is not limited to the disclosed embodiments but should be defined in accordance with claims which follow.

What is claimed is:

1. A location management apparatus functionally located in a mobile communication network, the location management apparatus maintaining a location of a mobile station wirelessly communicating with the mobile communication network, comprising:

a communication control configured to communicate with the mobile station, using the mobile communication network, and receive from the mobile station an identification of a transportation on which the mobile station is carried;

a location information storage in which the location of the mobile station is identifiable with reference to the identification of the transportation;

a transportation location finder configured to identify a communication area where the transportation is situated, based on movement information obtained from a traffic control that manages an operation of a transportation system including the transportation on which the mobile station is carried; and a paging control configured to, when a call for the mobile station comes, access the location information storage so as to find the communication area, where the transportation is situated, determined by the transportation location finder and cause a paging signal transmitted within the communication area.

2. A location management apparatus according to claim 1, wherein the communication area is a paging area.

3. A location management apparatus according to claim 1, wherein the location information storage is updated by a registration request from the mobile station which identifies either a communication area which the mobile station enters or a transportation on which the mobile station is carried.

4. A location management apparatus according to claim 1, wherein the transportation location finder determines the communication area where the transportation is situated, using a geographical location of the transportation contained in the movement information.

5. A location management apparatus according to claim 1, the transportation location finder is activated to find the communication area where the transportation is situated when a call is received for the mobile station being carried on the transportation.

6. A location management apparatus according to claim 1, wherein the location information storage and the transportation location finder are located on different servers functionally connected to each other.

7. A location management apparatus according to claim 1, wherein the location information storage comprises:
 a first table in which locations of mobile stations are identified with reference to the transportations on which some of the mobile stations are being carried and communication areas where the other of the mobile stations are situated; and
 a second table in which locations of the transportations are identified with reference to communication areas where the transportations are situated.

8. A location management apparatus according to claim 7, wherein the second table is updated by an update request from the transportation location finder receiving the movement information of the transportation.

9. A location management apparatus according to claim 1, further comprising a receiver that receives travel information from the mobile station which transmits the travel information in response to the paging signal initiated by the location management apparatus.

10. A location management apparatus according to claim 9, wherein the travel information comprises a geographical location of the mobile station, a traveling direction thereof and a traveling speed thereof.

11. A location management apparatus according to claim 4, further comprising a transportation travel information storage accessible by the transportation location finder which maintains geographical locations of the transportations.

12. A location management apparatus according to claim 11, wherein the transportation travel information storage stores travel statuses of the transportations, wherein the travel status comprises a delay in schedule.

13. A location management apparatus according to claim 12, wherein the travel statuses of the transportations are receivable by the location management apparatus.

14. A location management apparatus according to claim 11, further comprising a schedule information storage that stores travel schedules of the transportations, wherein based on information stored in the transportation travel information storage and the schedule information storage, the location management apparatus determines a future location of a transportation.

15. A location management apparatus according to claim 14, wherein the travel schedules of the transportations are receivable by the location management apparatus.

16. A location management apparatus according to claim 1, wherein a location of a mobile station stored in the location information storage is updated by a registration request from a transportation which identifies the transportation and the mobile station.

* * * * *

UNITED STATES PATENT AND TRADEMARK OFFICE
CERTIFICATE OF CORRECTION

PATENT NO. : 7,574,222 B2  Page 1 of 1
APPLICATION NO. : 10/082797
DATED : August 11, 2009
INVENTOR(S) : Sawada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 640 days.

Signed and Sealed this

Fourteenth Day of December, 2010

David J. Kappos
*Director of the United States Patent and Trademark Office*